(12) United States Patent
Dooley et al.

(10) Patent No.: US 10,465,093 B2
(45) Date of Patent: Nov. 5, 2019

(54) SURFACE LAYER AND FUSER MEMBER (71) Applicant: Xerox Corporation, Norwalk, CT (US)

(72) Inventors: Brynn Mary Dooley, Toronto (CA); Yu Qi, Penfield, NY (US); Edward Graham Zwartz, Mississauga (CA); Nan-Xing Hu, Oakville (CA)

(73) Assignee: Xerox Corporation, Norwalk, CT (US)

( * ) Notice: Subject to any disclaimer, the term of this patent is extended or adjusted under 35 U.S.C. 154(b) by 133 days.

(21) Appl. No.: 15/379,810

(22) Filed: Dec. 15, 2016

(65) Prior Publication Data

US 2017/0096569 A1 Apr. 6, 2017

Related U.S. Application Data (63) Continuation of application No. 14/187,468, filed on Feb. 24, 2014, now Pat. No. 10,030,170.

(51) Int. Cl.
*C09D 183/08* (2006.01)
*C09D 7/40* (2018.01)
*C09D 5/24* (2006.01)
*C09D 127/12* (2006.01)
*D01D 5/00* (2006.01)
*D04H 1/728* (2012.01)
*G03G 15/20* (2006.01)
*C08G 77/24* (2006.01)
*C08K 3/08* (2006.01)
*C08K 7/06* (2006.01)

(52) U.S. Cl.
CPC ............ *C09D 183/08* (2013.01); *C09D 5/24* (2013.01); *C09D 7/70* (2018.01); *C09D 127/12* (2013.01); *D01D 5/003* (2013.01); *D04H 1/728* (2013.01); *G03G 15/2057* (2013.01); *G03G 15/2064* (2013.01); *C08G 77/24* (2013.01); *C08K 3/08* (2013.01); *C08K 7/06* (2013.01); *D10B 2101/20* (2013.01); *D10B 2321/08* (2013.01); *G03G 2215/2054* (2013.01); *Y10T 428/265* (2015.01); *Y10T 428/31612* (2015.04)

(58) Field of Classification Search
None
See application file for complete search history.

(56) References Cited

U.S. PATENT DOCUMENTS

| 5,141,788 A | 8/1992 | Badesha et al. |
| 5,332,641 A * | 7/1994 | Finn ..................... C09D 127/12 428/444 |
| 5,576,818 A | 11/1996 | Badesha et al. |

(Continued)

FOREIGN PATENT DOCUMENTS

WO 2012141058 A1 10/2012

OTHER PUBLICATIONS

U.S. Appl. No. 14/082,801, Office Action 1 dated Feb. 1, 2017, 28 pages.

(Continued)

*Primary Examiner* — Chinessa T. Golden
(74) *Attorney, Agent, or Firm* — Hoffman Warnick LLC (57) ABSTRACT

Described is a fuser member including a substrate and a release layer disposed on the substrate. The release layer includes a fluoropolymer having a plurality of metal fibers having a diameter of from about 5 nanometers to about 20 microns dispersed throughout the fluoropolymer. A method of manufacturing the fuser member is also provided.

17 Claims, 6 Drawing Sheets

(56) References Cited

U.S. PATENT DOCUMENTS

| | | | |
|---|---|---|---|
| 5,677,410 | A | 10/1997 | Mager et al. |
| 5,933,695 | A | 8/1999 | Henry et al. |
| 7,991,340 | B2 | 8/2011 | Qi et al. |
| 2006/0207967 | A1 | 9/2006 | Bocko et al. |
| 2010/0226701 | A1* | 9/2010 | Moorlag ............ G03G 15/2057 399/333 |
| 2010/0264266 | A1 | 10/2010 | Tsotsis |
| 2012/0003415 | A1* | 1/2012 | Fromm .............. G03G 15/2014 428/36.91 |
| 2012/0208421 | A1 | 8/2012 | Qi et al. |
| 2012/0224897 | A1 | 9/2012 | Qi et al. |
| 2013/0270179 | A1 | 10/2013 | Qi et al. |
| 2014/0034360 | A1 | 2/2014 | Tanaka et al. |

OTHER PUBLICATIONS

U.S. Appl. No. 14/082,811, Office Action 1 dated Feb. 1, 2017, 29 pages.
U.S. Appl. No. 14/082,806, Office Action 1 dated Mar. 24, 2016, 18 pages.
Bigg, Donald M., "Mechanical, Thermal, and Electrical Properties of Metal Fiber-Filled Polymer Composites," Polymer Engineering and Science, Dec. 1979, vol. 19, No. 16, 5 pages.
U.S. Appl. No. 14/082,806, Final Office Action 1 dated Aug. 30, 2016, 11 pages.
U.S. Appl. No. 14/082,801, Final Office Action 1 dated Aug. 17, 2017, 20 pages.
U.S. Appl. No. 14/082,811, Final Office Action dated Aug. 17, 2017, 22 pages.

* cited by examiner

SURFACE LAYER AND FUSER MEMBER

CROSS REFERENCE TO RELATED APPLICATIONS

This application is a continuation of commonly assigned co-pending application Ser. No. 14/082,808, filed on Nov. 18, 2013 and is incorporated by reference herein.

BACKGROUND

Field of Use

This disclosure is generally directed to surface layers for fuser members useful in electrophotographic imaging apparatuses, including digital, image on image, and the like.

Background

Generally, in a commercial electrophotographic marking or reproduction apparatus (such as copier/duplicators, printers, multifunctional systems or the like), a latent image charge pattern is formed on a uniformly charged photoconductive or dielectric member. Pigmented marking particles (toner) are attracted to the latent image charge pattern to develop this image on the photoconductive or dielectric member. A receiver member, such as paper, is then brought into contact with the dielectric or photoconductive member and an electric field applied to transfer the marking particle developed image to the receiver member from the photoconductive or dielectric member. After transfer, the receiver member bearing the transferred image is transported away from the dielectric member to a fusion station and the image is fixed or fused to the receiver member by heat and/or pressure to form a permanent reproduction thereon. The receiving member passes between a pressure roll and a heated fuser roll or element.

Fluoropolymers have utility in a variety of applications due to superior chemical and thermal stability, as well a low coefficient of friction. Fluoropolymers are thermally insulating and thus heat transfer through a fluoropolymeric coating is poor.

Higher fusing speed can be achieved by increasing the thermal conductivity of the surface layer of the fuser member. Increased thermal conductivity of the fuser surface also allows for a lower fusing temperature and a wider fusing latitude. Various thermally conductive fillers have been disclosed for increasing thermal conductivity of the fuser surface. Carbon nanotubes (CNT) having a fluoroelastomer sheath dispersed in a fluoroplastic are described in U.S. Pat. No. 7,991,340. However, carbon nanotubes are costly to produce and available in relatively small quantities compared to other bulk chemicals. In addition, the production of carbon nanotubes is energy intensive. Furthermore, the impact on the environment and human health from long-term exposure to freeform carbon nanotubes is unknown. Fuser surfaces having increased thermal conductivity without negatively impacting fusing performance are desired.

SUMMARY

According to an embodiment, there is provided a fuser member including a substrate and a release layer disposed on the substrate. The release layer includes a fluoropolymer having a plurality of metal fibers having a diameter of from about 5 nm to about 20 μm dispersed throughout the fluoropolymer.

According to another embodiment, there is provided a surface layer including a fluoropolymer having a plurality of metal fibers of a diameter of from 5 nanometers to about 20 microns dispersed throughout the fluoropolymer.

According to another embodiment, there is provided a method of manufacturing a fuser member. The method includes providing a conductive substrate and electrospinning a metal particle dispersion core and a polypropylene carbonate sheath on the conductive substrate to form a non-woven fiber layer. A mixture of a fluoropolymer and a solvent is coated on the non-woven fiber layer. The non-woven fiber layer is heated to form a layer of fluoropolymer having a plurality of metal fibers of a diameter of from about 5 nanometers to about 20 microns dispersed throughout the fluoropolymer on the conductive substrate.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the FIGS. have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Illustrations with respect to one or more implementations, alterations and/or modifications can be made to the illustrated examples without departing from the spirit and scope of the appended claims. In addition, while a particular feature may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

Disclosed herein is a surface layer for a fuser member and a method of making the fuser member. Fluoropolymer composite coatings containing a plurality of metal fibers are described. More specifically, a fuser member can be prepared by coating metal core and polymer sheath fibers to form a non-woven fiber mat via an electrospinning process. A fluoropolymer mixture is coated onto the non-woven fiber mat. The non-woven fiber mat having the fluoropolymer coated mixture is heated to remove the polymer sheath from the fibers and cure or melt the fluoropolymer to form a layer. The layer has metal fibers having a diameter of from about 5 nm to about 20 μm dispersed homogenously throughout the fluoropolymer. The resulting surface layer or release layer that exhibits a high thermal conductivity owing to the metal fibers dispersed within the fluoropolymer. The release layer exhibits chemical and thermal stability.

Polyimide membranes comprising a mat of non-woven polyimide fibers having a fluoropolymer sheath are described in U.S. Ser. No. 13/444,366 filed on Apr. 11, 2012 and incorporated in its entirety by reference herein. Polyimide membranes comprising a mat of non-woven polyimide and siloxyfluorocarbon are described in U.S. Ser. No. 13/706,027 filed on Dec. 5, 2013 and incorporated in its entirety by reference herein.

In various embodiments, the fixing member can include, for example, a substrate, with one or more functional layers formed thereon. The substrate can be formed in various shapes, e.g., a cylinder (e.g., a cylinder tube), a cylindrical drum, a belt, or a film, using suitable materials that are non-conductive or conductive depending on a specific configuration, for example, as shown in FIGS. 1 and 2.

Figure 1:
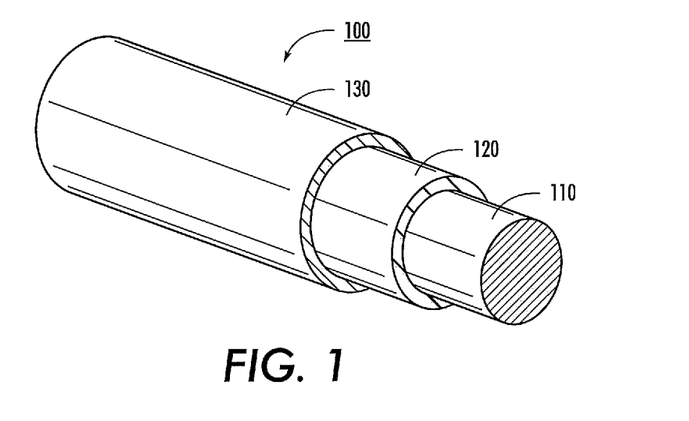
FIG. 1 depicts an exemplary fusing member having a cylindrical substrate in accordance with the present teachings.
Figure 2:
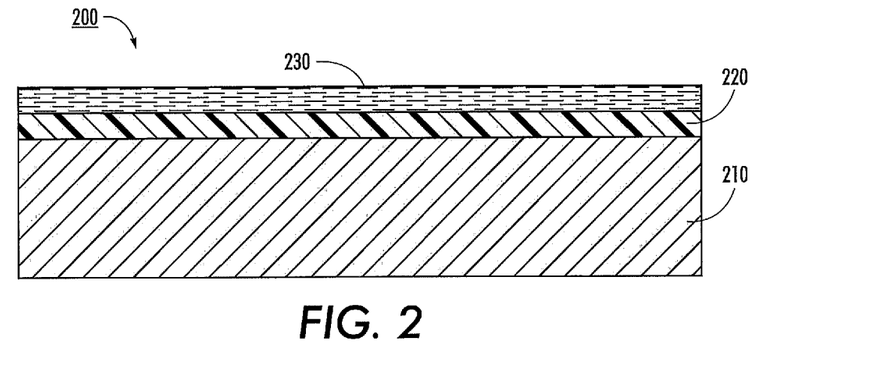
FIG. 2 depicts an exemplary fusing member having a belt substrate in accordance with the present teachings.

Specifically, FIG. 1 depicts an exemplary fixing or fusing member 100 having a cylindrical substrate 110 and FIG. 2 depicts in cross-section another exemplary fixing or fusing member 200 having a belt substrate 210 in accordance with the present teachings. It should be readily apparent to one of ordinary skill in the art that the fixing or fusing member 100 depicted in FIG. 1 and the fixing or fusing member 200 depicted in FIG. 2 represent generalized schematic illustrations and that other layers/substrates can be added or existing layers/substrates can be removed or modified.

In FIG. 1, the exemplary fixing member 100 can be a fuser roller having a cylindrical substrate 110 with one or more functional layers 120 (also referred to as intermediate layers) and a surface layer 130 formed thereon. In embodiments detailed herein the surface layer 130 can be two distinct layers. This is not shown in FIG. 1. In various embodiments, the cylindrical substrate 110 can take the form of a cylindrical tube, e.g., having a hollow structure including a heating lamp therein, or a solid cylindrical shaft. In FIG. 2, the exemplary fixing member 200 can include a belt substrate 210 with one or more functional layers, e.g., 220 and an outer surface 230 formed thereon. In embodiments detailed herein the surface layer 230 can be two distinct layers. This is not shown in FIG. 2.

Substrate Layer

The belt substrate 210 (FIG. 2) and the cylindrical substrate 110 (FIG. 1) can be formed from, for example, polymeric materials (e.g., polyimide, polyaramide, polyether ether ketone, polyetherimide, polyphthalamide, polyamide-imide, polyketone, polyphenylene sulfide, fluoropolyimides or fluoropolyurethanes) and metal materials (e.g., aluminum or stainless steel) to maintain rigidity and structural integrity as known to one of ordinary skill in the art.

Intermediate Layer

Examples of intermediate or functional layers 120 (FIG. 1) and 220 (FIG. 2) include fluorosilicones, silicone rubbers such as room temperature vulcanization (RTV) silicone rubbers, high temperature vulcanization (HTV) silicone rubbers, and low temperature vulcanization (LTV) silicone rubbers. These rubbers are known and readily available commercially, such as SILASTIC® 735 black RTV and SILASTIC® 732 RTV, both from Dow Corning; 106 RTV Silicone Rubber and 90 RTV Silicone Rubber, both from General Electric; and JCR6115CLEAR HTV and SE4705U HTV silicone rubbers from Dow Corning Toray Silicones. Other suitable silicone materials include the siloxanes (such as polydimethylsiloxanes); fluorosilicones such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182. Commercially available LSR rubbers include Dow Corning Q3-6395, Q3-6396, SILASTIC® 590 LSR, SILASTIC® 591 LSR, SILASTIC® 595 LSR, SILASTIC® 596 LSR, and SILASTIC® 598 LSR from Dow Corning. The functional layers provide elasticity and can be mixed with inorganic particles, for example SiC or $Al_2O_3$, as required.

Examples of intermediate or functional layers 120 (FIG. 1) and 220 (FIG. 2) also include fluoroelastomers. Fluoroelastomers are from the class of 1) copolymers of two of vinylidenefluoride, hexafluoropropylene, and tetrafluoroethylene; such as those known commercially as VITON A®, 2) terpolymers of vinylidenefluoride, hexafluoropropylene, and tetrafluoroethylene such as those known commercially as VITON B®; and 3) tetrapolymers of vinylidenefluoride, hexafluoropropylene, tetrafluoroethylene, and a cure site monomer, such as those known commercially as VITON GH® or VITON GF®. These fluoroelastomers are known commercially under various designations such as those listed above, along with VITON E®, VITON E 60C®, VITON E430®, VITON 910®, and VITON ETP®. The VITON® designation is a trademark of E. I. DuPont de Nemours, Inc. The cure site monomer can be 4-bromoperfluorobutene-1,1,1-dihydro-4-bromoperfluorobutene-1,3-bromoperfluoropropene-1,1,1-dihydro-3-bromoperfluoropropene-1, or any other suitable, known cure site monomer, such as those commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a registered trademark of 3M Company. Additional commercially available materials include AFLAS™ a poly(propylene-tetrafluoroethylene), and FLUOREL II® (LII900) a poly(propylene-tetrafluoroethylenevinylidenefluoride), both also available from 3M Company, as well as the Tecnoflons identified as FOR-60KIR®, FOR-LHF®, NM® FOR-THF®, FOR-TFS®, TH®, NH®, P757®, TNS®, T439®, PL958®, BR9151® and TN505®, available from Ausimont.

The fluoroelastomers VITON GH® and VITON GF® have relatively low amounts of vinylidenefluoride. The VITON GF® and VITON GH® have about 35 weight percent of vinylidenefluoride, about 34 weight percent of hexafluoropropylene, and about 29 weight percent of tetrafluoroethylene, with about 2 weight percent cure site monomer. Cure site monomers are available from Dupont.

For a roller configuration, the thickness of the intermediate or functional layer can be from about 0.5 mm to about 10 mm, or from about 1 mm to about 8 mm, or from about 2 mm to about 7 mm. For a belt configuration, the functional layer can be from about 25 microns up to about 2 mm, or from 40 microns to about 1.5 mm, or from 50 microns to about 1 mm.

Release Layer or Surface Layer

Fluoropolymer composite coatings containing a plurality of metal fibers are described. More specifically, a fuser member can be prepared by coating metal core and polymer sheath fibers to form a non-woven fiber mat on an intermediate layer of a fuser member via an electrospinning process. A fluoropolymer mixture is coated onto the non-woven fiber mat. The non-woven fiber mat having the fluoropolymer coated mixture is heated to remove the polymer sheath from the fibers and cure or melt the fluoropolymer to form a layer. The layer has metal fibers having a diameter of from about 5 nm to about 20 µm dispersed homogenously throughout the fluoropolymer. The resulting surface layer or release layer that exhibits a high thermal conductivity owing to the metal fibers dispersed within the fluoropolymer. The release layer exhibits chemical and thermal stability.

Additives and additional conductive fillers may be present in the substrate layers 110 (FIG. 1) and 210 (FIG. 2), the intermediate layers 120 (FIG. 1) and 220 (FIG. 2) and the release layers 130 (FIG. 1) and 230 (FIG. 2). In various embodiments, other filler materials or additives including, for example, inorganic particles, can be used for the coating composition and the subsequently formed surface layer. Conductive fillers used herein may include carbon black, graphene, graphite, alumina, silica, boron nitride, aluminum nitride, silicon carbide, titanium dioxide, indium oxide and zinc oxide. In various embodiments, other additives known to one of ordinary skill in the art can also be included to form the disclosed composite materials.

Adhesive Layer

Optionally, any known and available suitable adhesive layer may be positioned between the outer layer or surface layer and the intermediate layer or between the intermediate layer and the substrate layer. Examples of suitable adhesives include silanes such as amino silanes (such as, for example, HV Primer 10 from Dow Corning), titanates, zirconates, aluminates, and the like, and mixtures thereof. In an embodiment, an adhesive in from about 0.001 percent to about 10 percent solution can be wiped on the substrate. The adhesive layer can be coated on the substrate, or on the outer layer, to a thickness of from about 2 nanometers to about 10,000 nanometers, or from about 2 nanometers to about 1,000 nanometers, or from about 2 nanometers to about 5000 nanometers. The adhesive can be coated by any suitable known technique, including spray coating or wiping.

Figure 3A:
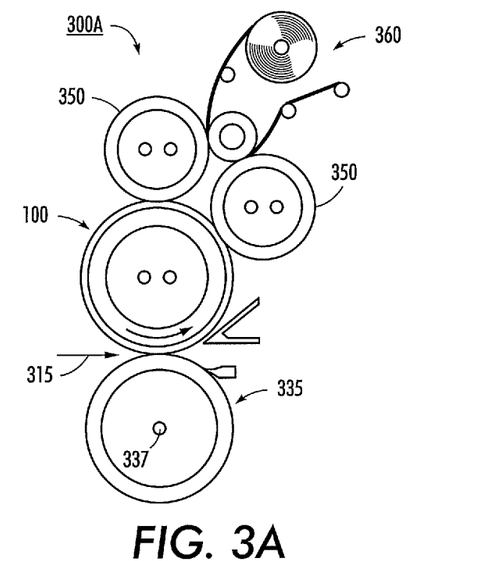
FIGS. 3A-3B depict exemplary fusing configurations using the fuser rollers shown in FIG. 1 in accordance with the present teachings.
Figure 3B:
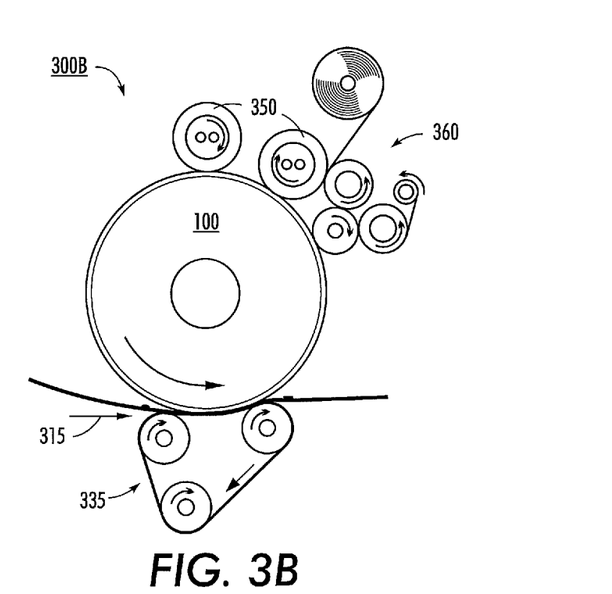
Figure 4A:
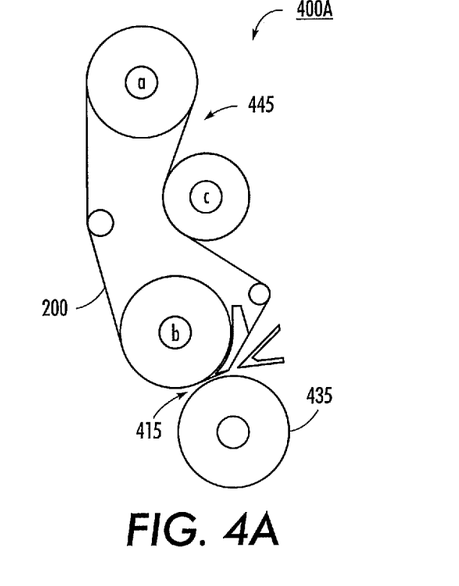
FIGS. 4A-4B depict another exemplary fusing configuration using the fuser belt shown in FIG. 2 in accordance with the present teachings.
Figure 4B:
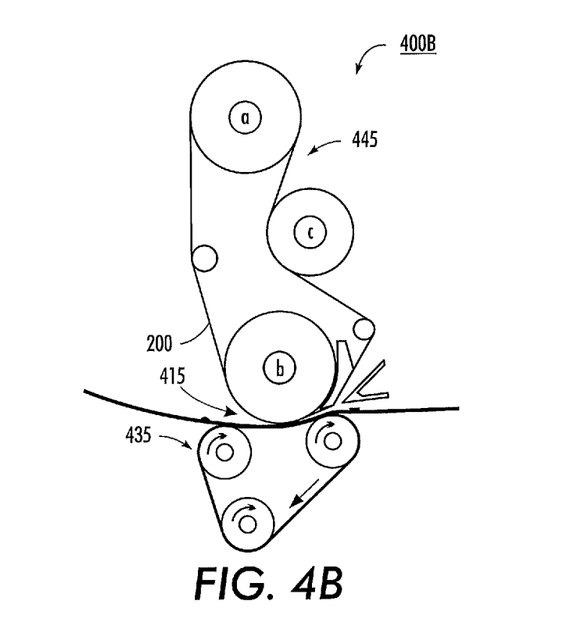

FIGS. 3A-3B and FIGS. 4A-4B depict exemplary fusing configurations for the fusing process in accordance with the present teachings. It should be readily apparent to one of ordinary skill in the art that the fusing configurations 300A-B depicted in FIGS. 3A-3B and the fusing configurations 400A-B depicted in FIGS. 4A-4B represent generalized schematic illustrations and that other members/layers/substrates/configurations can be added or existing members/layers/substrates/configurations can be removed or modified. Although an electrophotographic printer is described herein, the disclosed apparatus and method can be applied to other printing technologies. Examples include offset printing and inkjet and solid ink transfix machines.

FIGS. 3A-3B depict the fusing configurations 300A-B using a fuser roller shown in FIG. 1 in accordance with the present teachings. The configurations 300A-B can include a fuser roller 100 (i.e., 100 of FIG. 1) that forms a fuser nip with a pressure applying mechanism 335, such as a pressure roller in FIG. 3A or a pressure belt in FIG. 3B, for an image supporting material 315. In various embodiments, the pressure applying mechanism 335 can be used in combination with a heat lamp 337 to provide both the pressure and heat for the fusing process of the toner particles on the image supporting material 315. In addition, the configurations 300A-B can include one or more external heat roller 350 along with, e.g., a cleaning web 360, as shown in FIG. 3A and FIG. 3B.

FIGS. 4A-4B depict fusing configurations 400A-B using a fuser belt shown in FIG. 2 in accordance with the present teachings. The configurations 400A-B can include a fuser belt 200 (i.e., 200 of FIG. 2) that forms a fuser nip with a pressure applying mechanism 435, such as a pressure roller in FIG. 4A or a pressure belt in FIG. 4B, for a media substrate 415. In various embodiments, the pressure applying mechanism 435 can be used in a combination with a heat lamp to provide both the pressure and heat for the fusing process of the toner particles on the media substrate 415. In addition, the configurations 400A-B can include a mechanical system 445 to move the fuser belt 200 and thus fusing the toner particles and forming images on the media substrate 415. The mechanical system 445 can include one or more rollers 445a-c, which can also be used as heat rollers when needed.

Figure 5:
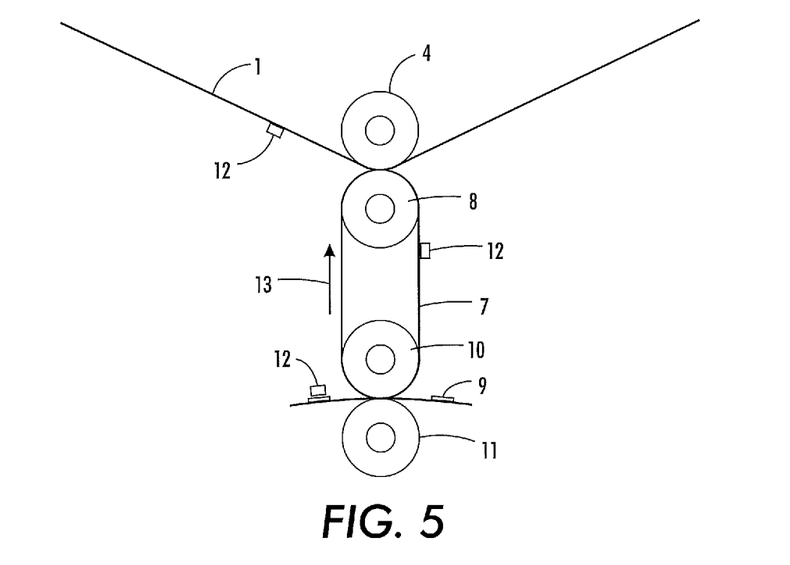
FIG. 5 depicts an exemplary fuser configuration using a transfix apparatus.

FIG. 5 demonstrates a view of an embodiment of a transfix member 7 which may be in the form of a belt, sheet, film, or like form. The transfix member 7 is constructed similarly to the fuser belt 200 described above. The developed image 12 positioned on intermediate transfer member 1 is brought into contact with and transferred to transfix member 7 via rollers 4 and 8. Roller 4 and/or roller 8 may or may not have heat associated therewith. Transfix member 7 proceeds in the direction of arrow 13. The developed image is transferred and fused to a copy substrate 9 as copy substrate 9 is advanced between rollers 10 and 11. Rollers 10 and/or 11 may or may not have heat associated therewith.

The fuser surface layer includes metal nanowires or fibers homogenously dispersed within a fluoropolymer.

Electrospinning has been used for the production of nanofibers. When a metal compound is used as the core of the electrospun fibers, nanowires of metal can be produced. Metal nanoparticles produce electrospun metal fibers that have sub-micron diameters. The nanowires are produced by coaxial electrospinning a sacrificial polymer sheath with a metal nanoparticle core solution. The sacrificial polymer sheath includes polypropylene carbonate (PPC). A fluoropolymer dispersion or solution is coated on the nanowires having the polymer sheath. The dispersion or solution is heated which cures the fluoropolymer and removes the polymer sheath. The PPC sheath stabilizes the metal nanowires during the fluoropolymer coating and heating steps. The removal of the PPC sheath after fluoropolymer coating ensures the nanowires are dispersed evenly throughout the composite.

The resulting composite has a high thermal conductivity owing to the metal nanowires phase dispersed homogeneously through the fluoropolymer. The high surface-to-volume ratio of the metal nanowires results result in high thermal and electrical conductivity at low weight percent loading of the metal nanowires. The resulting surface layer exhibits enhanced mechanical properties imparted by the inherent mechanical strength and exceptionally high aspect ratio of the nanowires. This surface layer is useful in heat sink applications where fouling is a problem or as a topcoat on touchable electronic surfaces that function by monitoring changes in electrical current.

Nonwoven fabrics are broadly defined as sheet or web structures bonded together by entangling fiber or filaments (and by perforating films) mechanically, thermally or chemically. They include flat, porous sheets that are made directly from separate fibers or from molten plastic or plastic film. They are not made by weaving or knitting and do not require converting the fibers to yarn.

Figure 6:
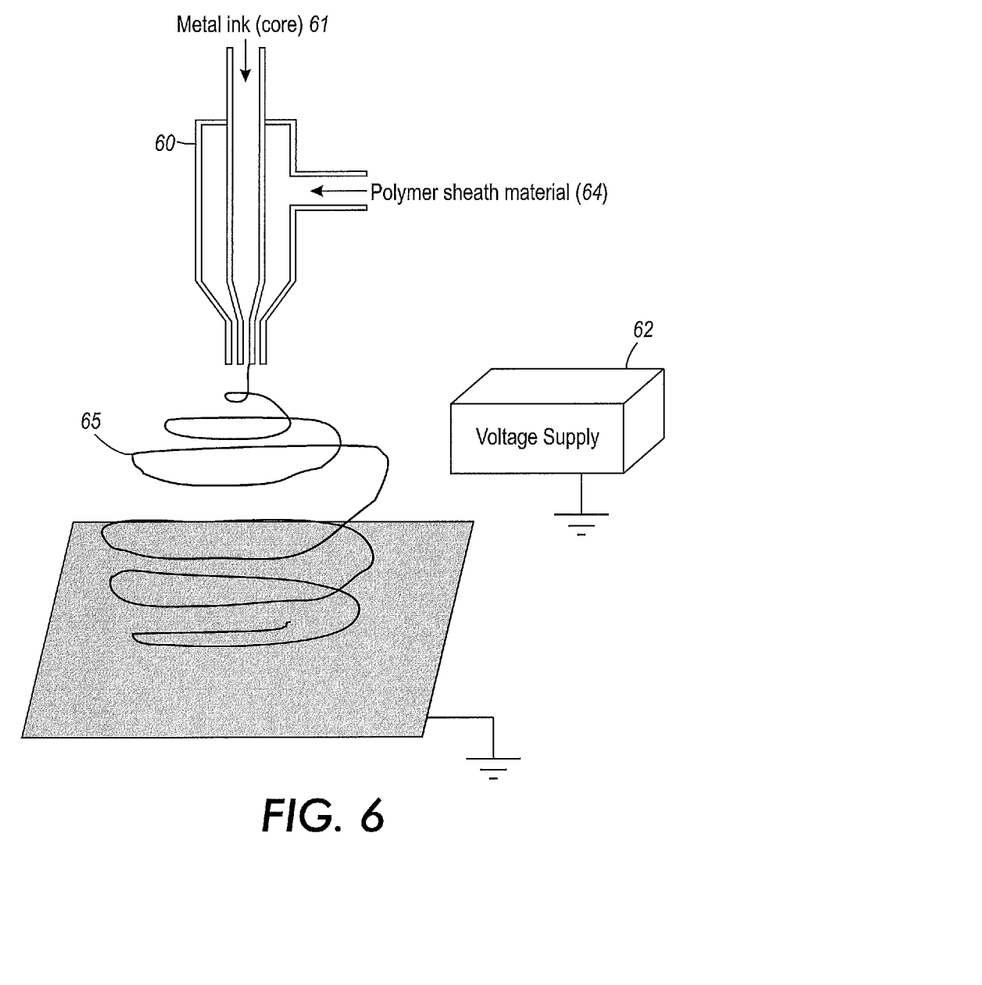
FIG. 6 is a schematic of an electospinning apparatus.

The fuser topcoat is fabricated using the electrospinning device 60 shown in FIG. 6. Electrospinning uses an electrical charge to draw very fine (typically on the micro or nano scale) fibers from a liquid. The charge is provided by a voltage source 62. The process does not require the use of coagulation chemistry or high temperatures to produce threads from solution. When a sufficiently high voltage is applied to a liquid droplet, the body of the liquid becomes charged, and electrostatic repulsion counteracts the surface tension and the droplet is stretched. At a critical point a stream of liquid erupts from the surface. This point of eruption is known as the Taylor cone. If the molecular cohesion of the liquid is sufficiently high, stream breakup does not occur and a charged liquid jet is formed. The elongation and thinning of the fibers 65 resulting from this bending instability leads to the formation of uniform fibers with nanometer-scale diameters. Suitable equipment is available from Linari Engineering.

In electrospinning, a solid fiber is generated as the electrified jet (composed of a highly viscous polymer solution with a viscosity range of from about 1 to about 400 centipoises, or from about 5 to about 300 centipoises, or from about 10 to about 250 centipoises) is continuously stretched due to the electrostatic repulsions between the surface charges and the evaporation of solvent. Suitable solvents include dimethylformamide, dimethylacetamide, 1-methyl-2-pyrrolidone, tetrahydrofuran, a ketone such as acetone, methylethylketone, dichloromethane, an alcohol such as ethanol, isopropyl alcohol, water and mixtures thereof. The weight percent of the metal or polymer in the solution ranges from about 1 percent to about 60 percent, or from about 5 percent to about 55 percent to from about 10 percent to about 50 percent.

Using metal ink 61 as the core and a polymer, such as PPC, as the sheath 64 the liquid is cohesive and does not break up. The result is sub-micron metal wires surrounded by a polymer sheath.

Exemplary materials used for the metal core. The metal core includes metals such as copper, silver, zinc, gold, nickel, platinum and palladium. Examples of solvent used to in the dispersion or metal ink include organic solvents such as decalin, toluene, water, dimethylformamide (DMF). The dispersion can include a stabilizer such as an organoamine or an organic carboxylate. The metal is in the form of nanoparticles having a size less than 10 nm. The dispersion is mixed and filtered prior to use. The resulting metal ink dispersion has a solids content of from about 20 weight percent to about 60 weight percent or from about 25 weight percent to about 55 weight percent or from about 30 weight percent to about 50 weight percent.

Exemplary polymers used for the sheath include polypropylene carbonate. PPC decomposes completely at temperatures above 250° C.

In embodiments, the electrospun fibers can have a diameter ranging from about 5 nm to about 20 µm, or ranging from about 50 nm to about 20 µm, or ranging from about 100 nm to about 10 µm. In embodiments, the electrospun fibers can have an aspect ratio at least about 10 or higher, e.g., ranging from about 100 to about 1,000,000, or ranging from about 100 to about 10,000, or ranging from about 100 to about 1,000.

Examples of fluoropolymers useful as the matrix used to surround the electrospun fibers having the metal core include fluoroelastomers. Fluoroelastomers are from the class of 1) copolymers of two of vinylidenefluoride, hexafluoropropylene, and tetrafluoroethylene; 2) terpolymers of vinylidenefluoride, hexafluoropropylene, and tetrafluoroethylene; and 3) tetrapolymers of vinylidenefluoride, hexafluoropropylene, tetrafluoroethylene, and a cure site monomer. These fluoroelastomers are known commercially under various designations such as VITON A®, VITON B®, VITON E®, VITON E 60C®, VITON E430®, VITON 910®, VITON GH-®; VITON GF®; and VITON ETP®. The VITON® designation is a trademark of E. I. DuPont de Nemours, Inc. The cure site monomer can be 4-bromoperfluorobutene-1,1,1-dihydro-4-bromoperfluorobutene-1,3-bromoperfluoropropene-1,1,1-dihydro-3-bromoperfluoropropene-1, or any other suitable, known cure site monomer, such as those commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a registered trademark of 3M Company. Additional commercially available materials include AFLAS™ a poly(propylene-tetrafluoroethylene), and FLUOREL II® (LII900) a poly(propylene-tetrafluoroethylenevinylidenefluoride), both also available from 3M Company, as well as the Tecnoflons identified as FOR-60KIR®, FOR-LHF®, NM® FOR-THF®, FOR-TFS®, TH®, NH®, P757®, TNS®, T439®, PL958®, BR9151® and TN505®, available from Solvay Solexis.

Examples of three known fluoroelastomers are (1) a class of copolymers of two of vinylidenefluoride, hexafluoropropylene, and tetrafluoroethylene, such as those known commercially as VITON A®; (2) a class of terpolymers of vinylidenefluoride, hexafluoropropylene, and tetrafluoroethylene known commercially as VITON B®; and (3) a class of tetrapolymers of vinylidenefluoride, hexafluoropropylene, tetrafluoroethylene, and cure site monomer known commercially as VITON GH® or VITON GF®.

The fluoroelastomers VITON GH® and VITON GF® have relatively low amounts of vinylidenefluoride. The VITON GF® and VITON GH® have about 35 weight percent of vinylidenefluoride, about 34 weight percent of hexafluoropropylene, and about 29 weight percent of tetrafluoroethylene, with about 2 weight percent cure site monomer.

Examples of fluoropolymers useful as the matrix used to surround the electrospun fibers having the metal core include fluoroplastics. Fluoroplastics suitable for use herein include fluoropolymers comprising a monomeric repeat unit that is selected from the group consisting of vinylidene fluoride, hexafluoropropylene, tetrafluoroethylene, perfluoroalkylvinylether, and mixtures thereof. Examples of fluoroplastics include polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP), and mixtures thereof.

The fluoropolymer is coated on the non-woven fibers having the metal core and PPC sheath with a suitable solvent. Suitable solvents can include water and/or organic solvents including, but not limited to, methyl isobutyl ketone (MIBK), acetone, methyl ethyl ketone (MEK), and mixtures thereof. Other solvents that can form suitable dispersions can be within the scope of the embodiments herein.

In various embodiments, the coating composition can be coated using, for example, coating techniques, extrusion techniques and/or molding techniques. As used herein, the term "coating technique" refers to a technique or a process for applying, forming, or depositing a dispersion on a material or a surface. Therefore, the term "coating" or "coating technique" is not particularly limited in the present teachings, and dip coating, painting, brush coating, roller coating, pad application, spray coating, spin coating, casting, or flow coating can be employed.

The fluoropolymer coating and non-woven fiber mesh having the metal core and PPC sheath is cured or melted at a temperature of from about 255° C. to about 360° C. or from about 280° C. to about 330° C. The sheath of PPC decomposes to water and $CO_2$ above 250° C. and off gases to leave metal fibers dispersed within a fluoropolymer matrix.

Fluoroplastics have a melting temperature of from about 280° C. to about 400° C. or from about 290° C. to about 390° C. or from about 300° C. to about 380° C. while fluoroelastomers are cured at a temperature of from about 80° C. to about 250° C.

In embodiments, the resulting surface layer has electrospun metal fibers that have a diameter ranging from about 5 nm to about 20 µm, or ranging from about 50 nm to about 20 µm, or ranging from about 100 nm to about 10 µm dispersed homogenously throughout the fluoropolymer. In embodiments, the electrospun metal fibers can have an aspect ratio at least about 10 or higher, e.g., ranging from about 10 to about 1,000,000 or ranging from about 100 to about 10,000, or ranging from about 100 to about 1,000. The metal fibers are from about 0.1 to about 5.0 weight percent of the surface layer.

The resulting surface layer has a thickness of from about 10 µm to about 400 µm, or from about 20 µm to about 300 µm, or from about 25 µm to about 200 µm.

Specific embodiments will now be described in detail. These examples are intended to be illustrative, and not limited to the materials, conditions, or process parameters set forth in these embodiments. All parts are percentages by solid weight unless otherwise indicated.

EXAMPLES

Electrospun core-sheath fibers were produced by coaxial electrospinning of Xerox silver ink and polypropylene carbonate (PPC) using the configuration shown in FIG. 6. The silver ink was annealed and the core-shell fibers were filled in with a fluoropolymer matrix.

A silver nanoparticle ink was prepared by adding 15.32 gram of decalin into 10.21 gram of silver nanoparticles having a size less than 10 nm. The dispersion was with an organoamine. The mixture was stirred for 24 hours and filtered with 1 um syringe filter, resulting a silver nanoparticle ink dispersion with 40 weight percent solid content in decalin.

Curing or melting of the fluoropolymer matrix and removal of the PPC sheath (PPC decomposes completely at 250° C.) resulted in sub-micron metal wires dispersed homogeneously throughout a fluoropolymer matrix. SEM images of silver-PPC core-sheath fibers produced using the electrospinning method are shown in FIG. 7.

Figure 7:
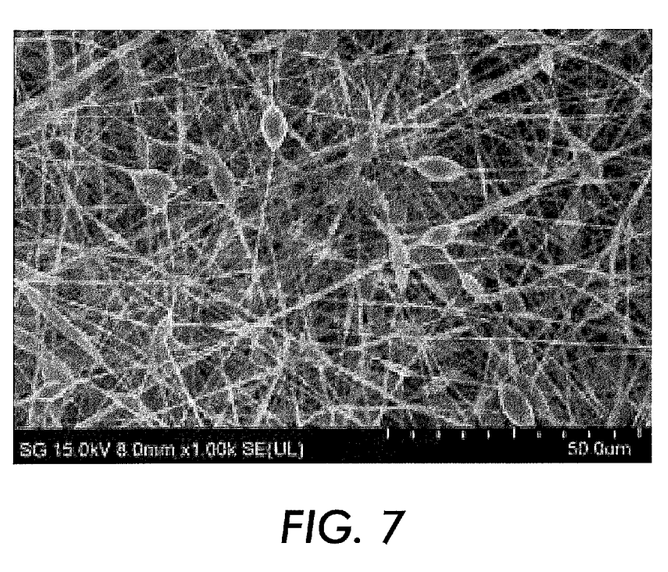
FIG. 7 is an SEM image of surface layer having metal fibers dispersed in a fluoropolymer.

The SEM image in FIG. 7 shows the morphology of electrospun PPC/Ag composite nanofiber. The bright lines along the sides of the PPC fibers are where silver nanoparticles are present. Agglomerations of silver nanoparticles are visible as bright circles inside the PPC fibers.

It will be appreciated that variants of the above-disclosed and other features and functions or alternatives thereof may be combined into other different systems or applications. Various presently unforeseen or unanticipated alternatives, modifications, variations, or improvements therein may be subsequently made by those skilled in the art, which are also encompassed by the following claims.

What is claimed is:

1. A fuser member comprising:
   a substrate; and
   a release layer disposed on the substrate, the release layer comprising a fluoropolymer having a plurality of metal fibers selected from the group consisting of: copper, silver, zinc, gold, nickel, platinum and palladium, having a diameter of from about 50 nanometers to about 20 microns dispersed throughout the fluoropolymer.

2. The fuser member of claim 1, wherein the plurality of metal fibers comprise from about 0.1 weight percent to about 5.0 weight percent of the release layer.

3. The fuser member of claim 1, wherein the plurality of metal fibers have an aspect ratio of at least about 10.

4. The fuser member of claim 1, wherein the release layer has a thickness of about 10 µm to about 400 µm.

5. The fuser member of claim 1, wherein the release layer further comprises conductive particles selected from the group consisting of: carbon black, graphene, graphite, alumina, silica, boron nitride, aluminum nitride, silicon carbide, titanium dioxide, indium oxide and zinc oxide dispersed in the release layer.

6. The fuser member of claim 1, wherein the fluoropolymer comprises a fluoroelastomer selected from the group consisting of: copolymers of vinylidenefluoride, hexafluoropropylene and tetrafluoropropylene and tetrafluoroethylene; terpolymers of vinylidenefluoride, hexafluoropropylene and tetrafluoroethylene; tetrapolymers of vinylidenefluoride, hexafluoropropylene, tetrafluoroethylene, and a cure site monomer.

7. The fuser member of claim 1, wherein the fluoropolymer comprises a fluoroplastic selected from the group consisting of: polytetrafluoroethylene (PTFE); perfluoroalkoxy polymer resin (PFA); copolymers of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); tetrapolymers of tetrafluoroethylene (TFE), vinylidene fluoride (VF2), and hexafluoropropylene (HFP) and a cure site monomer; and mixtures thereof.

8. The fuser member of claim 1, further comprising an intermediate layer disposed between the substrate and the release layer.

9. The fuser member of claim 8, wherein the intermediate layer comprises a material selected from the group consisting of fluoroelastomer and silicone.

10. A surface layer comprising:
   a fluoropolymer having a plurality of metal fibers selected from the group consisting of: copper, silver, zinc, gold, nickel, platinum and palladium, of a diameter of from 50 nanometers to about 20 microns dispersed throughout the fluoropolymer.

11. The surface layer of claim 10, wherein the plurality of metal fibers comprise from about 0.1 weight percent to about 5.0 weight percent of the surface layer.

12. The surface layer of claim 10, wherein the plurality of metal fibers have an aspect ratio at least about 10.

13. The surface layer of claim 10, wherein the fluoropolymer comprises a fluoroplastic selected from the group consisting of polytetrafluoroethylene (PTFE); perfluoroalkoxy polymer resin (PFA); copolymers of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); tetrapolymers of tetrafluoroethylene (TFE), vinylidene fluoride (VF2), and hexafluoropropylene (HFP) and a cure site monomer; and mixtures thereof.

14. The surface layer of claim 10, wherein the fluoropolymer comprises a fluoroelastomer selected from the group consisting of: copolymers of vinylidenefluoride, hexafluoropropylene and tetrafluoropropylene and tetrafluoroethylene; terpolymers of vinylidenefluoride, hexafluoropropylene and tetrafluoroethylene; and tetrapolymers of vinylidenefluoride, hexafluoropropylene, tetrafluoroethylene, and a cure site monomer.

15. The surface layer of claim 10, wherein the surface layer has a thickness of about 10 μm to about 400 μm.

16. The surface layer of claim 10, wherein the surface layer further comprises conductive particles selected from the group consisting of: carbon black, graphene, graphite, alumina, silica, boron nitride, aluminum nitride, silicon carbide, titanium dioxide, indium oxide and zinc oxide dispersed in the surface layer.

17. A method of manufacturing a fuser member according to claim 1, the method comprising:
   providing a conductive substrate
   electrospinning a metal particle dispersion core selected from the group consisting of: copper, silver, zinc, gold, nickel, platinum and palladium, and a polypropylene carbonate sheath on the conductive substrate to form a non-woven fiber layer;
   coating a mixture of a fluoropolymer and a solvent on the non-woven fiber layer; and
   heating the non-woven fiber layer to form a layer of fluoropolymer having a plurality of metal fibers of a diameter of from about 50 nanometers to about 20 microns dispersed throughout the fluoropolymer on the conductive substrate.

\* \* \* \* \*